(12) United States Patent
AlBahrani et al.

(10) Patent No.: US 10,590,325 B2
(45) Date of Patent: Mar. 17, 2020

(54) SPACER FLUID COMPOSITIONS THAT INCLUDE SURFACTANTS

(71) Applicant: Saudi Arabian Oil Company, Dhahran (SA)

(72) Inventors: Hussain AlBahrani, Qatif (SA); Abdullah Al-Yami, Dhahran (SA); Vikrant Wagle, Abqaiq (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 15/586,555

(22) Filed: May 4, 2017

(65) Prior Publication Data

US 2018/0223169 A1 Aug. 9, 2018

Related U.S. Application Data

(60) Provisional application No. 62/454,189, filed on Feb. 3, 2017, provisional application No. 62/454,192, filed on Feb. 3, 2017.

(51) Int. Cl.
| | |
|---|---|
| *C09K 8/42* | (2006.01) |
| *C09K 8/40* | (2006.01) |
| *C04B 24/02* | (2006.01) |
| *C04B 28/02* | (2006.01) |
| *E21B 33/14* | (2006.01) |
| *C09K 8/24* | (2006.01) |
| *E21B 21/00* | (2006.01) |
| *C09K 8/22* | (2006.01) |
| *C09K 8/467* | (2006.01) |
| *C10M 173/00* | (2006.01) |
| *C04B 28/04* | (2006.01) |
| *C04B 28/08* | (2006.01) |
| *C09K 8/74* | (2006.01) |
| *E21B 43/25* | (2006.01) |
| *C09K 8/03* | (2006.01) |

(Continued)

(52) U.S. Cl.
CPC ............ *C09K 8/24* (2013.01); *B01F 17/0021* (2013.01); *B01F 17/0042* (2013.01); *B01F 17/0092* (2013.01); *C04B 7/527* (2013.01); *C04B 14/06* (2013.01); *C04B 24/02* (2013.01); *C04B 24/026* (2013.01); *C04B 24/085* (2013.01); *C04B 28/02* (2013.01); *C04B 28/04* (2013.01); *C04B 28/08* (2013.01); *C04B 38/02* (2013.01); *C09K 8/032* (2013.01); *C09K 8/035* (2013.01); *C09K 8/04* (2013.01); *C09K 8/08* (2013.01); *C09K 8/20* (2013.01); *C09K 8/22* (2013.01); *C09K 8/32* (2013.01); *C09K 8/36* (2013.01); *C09K 8/40* (2013.01); *C09K 8/424* (2013.01); *C09K 8/46* (2013.01); *C09K 8/467* (2013.01); *C09K 8/48* (2013.01); *C09K 8/487* (2013.01); *C09K 8/74* (2013.01); *C10M 105/18* (2013.01); *C10M 105/62* (2013.01); *C10M 107/34* (2013.01); *C10M 111/04* (2013.01); *C10M 173/00* (2013.01); *C10M 173/02* (2013.01); *E21B 21/00* (2013.01); *E21B 21/002* (2013.01); *E21B 21/003* (2013.01); *E21B 33/14* (2013.01); *E21B 43/25* (2013.01); *C04B 2103/40* (2013.01); *C04B 2103/46* (2013.01); *C04B 2111/00068* (2013.01); *C04B 2201/20* (2013.01); *C09K 2208/12* (2013.01); *C09K 2208/34* (2013.01); *C10M 2201/062* (2013.01); *C10M 2201/08* (2013.01); *C10M 2201/103* (2013.01); *C10M 2207/003* (2013.01); *C10M 2207/046* (2013.01); *C10M 2209/104* (2013.01); *C10M 2209/108* (2013.01); *C10M 2209/1045* (2013.01); *C10M 2215/042* (2013.01); *C10M 2215/08* (2013.01); *C10M 2215/265* (2013.01); *C10M 2215/28* (2013.01); *C10M 2217/044* (2013.01); *C10N 2220/021* (2013.01); *C10N 2220/022* (2013.01); *C10N 2220/032* (2013.01); *C10N 2230/06* (2013.01); *C10N 2240/401* (2013.01); *C10N 2250/022* (2013.01); *Y02W 30/92* (2015.05); *Y02W 30/94* (2015.05)

(58) Field of Classification Search
None
See application file for complete search history.

(56) References Cited

U.S. PATENT DOCUMENTS

| | | | |
|---|---|---|---|
| 2,589,949 | A | 3/1952 | Meadors |
| 2,782,163 | A | 2/1957 | Doyne et al. |

(Continued)

FOREIGN PATENT DOCUMENTS

| | | |
|---|---|---|
| AU | 5117264 A | 5/1967 |
| CA | 2495811 A1 | 3/2004 |

(Continued)

OTHER PUBLICATIONS

Office Action dated Dec. 12, 2018 pertaining to U.S. Appl. No. 15/581,136, filed Apr. 28, 2017.

(Continued)

*Primary Examiner* — Jeffrey D Washville
(74) *Attorney, Agent, or Firm* — Dinsmore & Shohl

(57) ABSTRACT

In one embodiment, a spacer fluid may comprise a base fluid and a surfactant package. The surfactant package may comprise one or more surfactants, where the surfactant package comprises a first surfactant having the chemical structure R—$(OC_2H_4)_x$—OH. R may be a hydrocarbyl group having from 9 to 20 carbon atom, and x may be an integer from 5 and 15. The first surfactant may have a hydrophilic-lipophilic balance (HLB) of from 12 to 13.5.

16 Claims, No Drawings

(51) Int. Cl.

| | | |
|---|---|---|
| *C09K 8/20* | (2006.01) | |
| *B01F 17/00* | (2006.01) | |
| *C09K 8/035* | (2006.01) | |
| *C09K 8/08* | (2006.01) | |
| *C09K 8/48* | (2006.01) | |
| *C04B 24/08* | (2006.01) | |
| *C09K 8/487* | (2006.01) | |
| *C04B 7/52* | (2006.01) | |
| *C09K 8/46* | (2006.01) | |
| *C09K 8/04* | (2006.01) | |
| *C04B 14/06* | (2006.01) | |
| *C04B 38/02* | (2006.01) | |
| *C10M 105/18* | (2006.01) | |
| *C10M 105/62* | (2006.01) | |
| *C10M 107/34* | (2006.01) | |
| *C10M 111/04* | (2006.01) | |
| *C09K 8/32* | (2006.01) | |
| *C09K 8/36* | (2006.01) | |
| *C10M 173/02* | (2006.01) | |
| *C04B 103/40* | (2006.01) | |
| *C04B 103/46* | (2006.01) | |
| *C04B 111/00* | (2006.01) | |

(56) References Cited

U.S. PATENT DOCUMENTS

| | | | |
|---|---|---|---|
| 2,786,027 A | 3/1957 | Salathiel | |
| 3,000,826 A | 9/1961 | Gilliland | |
| 3,044,959 A | 7/1962 | Martin et al. | |
| 3,048,538 A | 8/1962 | Rosenberg et al. | |
| 3,319,714 A | 5/1967 | Knox | |
| 3,353,603 A | 11/1967 | Knight et al. | |
| 3,720,610 A | 3/1973 | Erasmus | |
| 3,816,351 A | 6/1974 | Lancz | |
| 3,849,316 A | 11/1974 | Motley et al. | |
| 3,953,337 A | 4/1976 | Walker et al. | |
| 4,140,650 A | 2/1979 | Wilde | |
| 4,141,843 A | 2/1979 | Watson | |
| 4,172,800 A | 10/1979 | Walker | |
| 4,217,231 A | 8/1980 | King | |
| 4,280,943 A | 7/1981 | Bivens et al. | |
| 4,519,923 A | 5/1985 | Hori et al. | |
| 4,561,985 A | 12/1985 | Glass, Jr. | |
| 4,588,032 A | 5/1986 | Weigand et al. | |
| 4,626,362 A | 12/1986 | Dickert, Jr. et al. | |
| 4,658,036 A | 4/1987 | Schilling | |
| 4,687,516 A | 8/1987 | Burkhalter et al. | |
| 4,704,214 A | 11/1987 | Russell et al. | |
| 4,719,021 A | 1/1988 | Branch, III | |
| 4,842,065 A | 6/1989 | McClure | |
| 5,007,489 A | 4/1991 | Enright et al. | |
| 5,016,711 A | 5/1991 | Cowan | |
| 5,105,885 A | 4/1992 | Bray et al. | |
| 5,109,042 A | 4/1992 | Stephens | |
| 5,275,654 A | 1/1994 | Cowan | |
| 5,298,070 A | 3/1994 | Cowan | |
| 5,314,022 A | 5/1994 | Cowan et al. | |
| 5,330,662 A | 7/1994 | Jahnke et al. | |
| 5,348,993 A | 9/1994 | Daeumer et al. | |
| 5,399,548 A | 3/1995 | Patel | |
| 5,474,701 A | 12/1995 | Jaquess et al. | |
| RE35,163 E | 2/1996 | Christensen et al. | |
| 5,586,608 A | 12/1996 | Clark et al. | |
| 5,593,953 A | 1/1997 | Malchow, Jr. | |
| 5,593,954 A | 1/1997 | Malchow | |
| 5,602,082 A | 2/1997 | Hale et al. | |
| 5,618,780 A | 4/1997 | Argillier et al. | |
| 5,728,210 A | 3/1998 | Moran et al. | |
| 5,744,432 A | 4/1998 | Barnhorst et al. | |
| 5,850,880 A | 12/1998 | Moran et al. | |
| 5,996,693 A | 12/1999 | Heathman | |
| 6,063,737 A | 5/2000 | Haberman et al. | |
| H1932 H | 1/2001 | Heathman et al. | |
| 6,258,756 B1 | 7/2001 | Hayatdavoudi | |
| 6,632,779 B1 | 10/2003 | Vollmer et al. | |
| 6,803,346 B1 | 10/2004 | Bailey et al. | |
| 6,972,274 B1 | 12/2005 | Slikta et al. | |
| 6,974,852 B2 | 12/2005 | Stanger et al. | |
| 7,081,438 B2 | 7/2006 | Horton | |
| 7,262,152 B2 | 8/2007 | Monfreux-Gaillard et al. | |
| 7,318,477 B2 | 1/2008 | Hou | |
| 7,435,706 B2 | 10/2008 | Mueller et al. | |
| 7,799,742 B2 | 9/2010 | Dino | |
| 7,893,010 B2 | 2/2011 | Ali et al. | |
| 7,951,755 B2 | 5/2011 | Wu et al. | |
| 8,252,728 B2 | 8/2012 | Karagianni et al. | |
| 8,403,051 B2 | 3/2013 | Huang et al. | |
| 8,563,479 B2 | 10/2013 | Amanullah et al. | |
| 8,703,658 B2 | 4/2014 | Smith | |
| 8,741,989 B2 | 6/2014 | Martin et al. | |
| 8,932,997 B2 | 1/2015 | Merli et al. | |
| 8,936,111 B2 | 1/2015 | Maghrabi et al. | |
| 9,006,151 B2 | 4/2015 | Amanullah et al. | |
| 9,034,800 B2 | 5/2015 | Harris et al. | |
| 9,127,192 B2 | 9/2015 | Maghrabi et al. | |
| 9,175,205 B2 | 11/2015 | Amanullah et al. | |
| 10,287,476 B2 | 5/2019 | Al-Yami et al. | |
| 10,287,477 B2 | 5/2019 | Al-Yami et al. | |
| 2001/0027880 A1 | 10/2001 | Brookey | |
| 2003/0017953 A1 | 1/2003 | Horton et al. | |
| 2003/0127903 A1 | 7/2003 | Quintero | |
| 2004/0108113 A1 | 6/2004 | Luke et al. | |
| 2004/0144537 A1 | 7/2004 | Reddy et al. | |
| 2005/0049147 A1 | 3/2005 | Patel et al. | |
| 2006/0111245 A1 | 5/2006 | Carbajal et al. | |
| 2006/0174805 A1 | 8/2006 | Chatterji et al. | |
| 2006/0183842 A1 | 8/2006 | Johnson | |
| 2006/0254770 A1 | 11/2006 | Hou | |
| 2007/0015678 A1 | 1/2007 | Rodrigues et al. | |
| 2007/0093393 A1 | 4/2007 | Navarrete et al. | |
| 2007/0191235 A1 | 8/2007 | Mas et al. | |
| 2008/0006404 A1 | 1/2008 | Reddy et al. | |
| 2008/0194432 A1 | 4/2008 | Heidlas | |
| 2008/0171671 A1 | 7/2008 | Mueller et al. | |
| 2008/0217064 A1 | 9/2008 | Stoian et al. | |
| 2008/0308011 A1 | 12/2008 | Brothers et al. | |
| 2009/0042746 A1 | 2/2009 | Bailey | |
| 2009/0200033 A1 | 8/2009 | Kakadjian et al. | |
| 2009/0260885 A1 | 10/2009 | Pomerleau | |
| 2010/0016180 A1 | 1/2010 | Scoggins et al. | |
| 2010/0152067 A1 | 6/2010 | McDonald | |
| 2010/0152068 A1 | 6/2010 | Hartshorne et al. | |
| 2010/0263863 A1 | 10/2010 | Quintero et al. | |
| 2010/0319915 A1 | 12/2010 | Bustos et al. | |
| 2010/0326660 A1 | 12/2010 | Ballard et al. | |
| 2011/0306524 A1 | 12/2011 | Smith | |
| 2012/0000708 A1 | 1/2012 | van Zanten et al. | |
| 2012/0018226 A1 | 1/2012 | Nzeadibe et al. | |
| 2012/0241155 A1 | 9/2012 | Ali et al. | |
| 2012/0329683 A1 | 12/2012 | Droger et al. | |
| 2013/0079256 A1 | 3/2013 | Yang | |
| 2013/0092376 A1 | 4/2013 | Al-Subhi et al. | |
| 2013/0126243 A1 | 5/2013 | Smith | |
| 2013/0153232 A1 | 6/2013 | Bobier et al. | |
| 2013/0244913 A1 | 9/2013 | Maberry et al. | |
| 2013/0303410 A1 | 11/2013 | Wagle et al. | |
| 2013/0303411 A1 | 11/2013 | Wagle et al. | |
| 2014/0024560 A1 | 1/2014 | Gonzalez Poche et al. | |
| 2014/0024561 A1 | 1/2014 | Reddy | |
| 2014/0073540 A1 | 3/2014 | Berry et al. | |
| 2014/0102809 A1 | 4/2014 | King et al. | |
| 2014/0121135 A1 | 5/2014 | Gamage et al. | |
| 2014/0213489 A1 | 7/2014 | Smith | |
| 2014/0318785 A1 | 10/2014 | Reddy et al. | |
| 2014/0332212 A1 | 11/2014 | Ayers et al. | |
| 2015/0024975 A1 | 1/2015 | Ivagle et al. | |
| 2015/0034389 A1 | 2/2015 | Perez | |
| 2015/0080273 A1 | 3/2015 | Hatchman et al. | |
| 2015/0087563 A1 | 3/2015 | Brege et al. | |
| 2015/0159073 A1 | 6/2015 | Assmann et al. | |
| 2015/0240142 A1 | 8/2015 | Kefi et al. | |

(56) References Cited

U.S. PATENT DOCUMENTS

| | | | |
|---|---|---|---|
| 2015/0299552 | A1 | 10/2015 | Zamora et al. |
| 2016/0009981 | A1 | 1/2016 | Teklu et al. |
| 2016/0024370 | A1 | 1/2016 | Ba geri et al. |
| 2016/0069159 | A1 | 3/2016 | Teklu et al. |
| 2016/0177169 | A1* | 6/2016 | Zhang ............... C09K 8/52 507/261 |
| 2016/0186032 | A1 | 6/2016 | Yu et al. |
| 2016/0237340 | A1 | 8/2016 | Pandya et al. |
| 2016/0289529 | A1 | 10/2016 | Nguyen |
| 2017/0009125 | A1 | 1/2017 | Shaffer et al. |
| 2018/0223162 | A1 | 8/2018 | Al-Yami et al. |
| 2018/0265763 | A1 | 9/2018 | Leotaud et al. |

FOREIGN PATENT DOCUMENTS

| | | |
|---|---|---|
| CA | 2594108 A1 | 9/2008 |
| CA | 2810345 A1 | 3/2012 |
| CA | 2745017 A1 | 12/2012 |
| CN | 102120158 A | 7/2011 |
| CN | 101240218 B | 12/2011 |
| CN | 102041138 B | 12/2011 |
| CN | 102321461 A | 1/2012 |
| CN | 102382697 A | 3/2012 |
| CN | 102373042 B | 8/2013 |
| CN | 102464974 B | 8/2013 |
| CN | 103320203 A | 9/2013 |
| CN | 102500141 B | 1/2014 |
| CN | 103571599 A | 2/2014 |
| CN | 102899152 B | 4/2014 |
| CN | 102899154 B | 4/2014 |
| CN | 102977940 B | 11/2014 |
| CN | 104130839 A | 11/2014 |
| CN | 104559954 A | 4/2015 |
| CN | 103351925 B | 7/2015 |
| CN | 102373053 B | 8/2015 |
| CN | 103571578 B | 8/2015 |
| CN | 104830513 A | 8/2015 |
| CN | 104877749 A | 9/2015 |
| CN | 104910881 A | 9/2015 |
| CN | 105038737 A | 11/2015 |
| CN | 103757640 B | 12/2015 |
| CN | 105112036 A | 12/2015 |
| CN | 103773041 B | 1/2016 |
| CN | 105441051 A | 3/2016 |
| CN | 104449893 B | 5/2016 |
| CN | 103555304 B | 6/2016 |
| CN | 105623814 A | 6/2016 |
| CN | 105778992 A | 7/2016 |
| CN | 105861135 A | 8/2016 |
| EP | 0108546 A2 | 5/1984 |
| EP | 0243067 A2 | 10/1987 |
| EP | 0265563 A1 | 5/1988 |
| EP | 0296655 A1 | 12/1988 |
| EP | 315243 A1 | 5/1989 |
| EP | 331158 A2 | 9/1989 |
| EP | 0 395 815 A1 | 11/1990 |
| EP | 1003829 B1 | 5/2004 |
| EP | 1213270 B1 | 2/2005 |
| EP | 2708586 A1 | 3/2014 |
| GB | 2205748 A | 12/1988 |
| GB | 2283036 A | 4/1995 |
| GB | 2 343 447 A | 5/2000 |
| JP | 07109472 A | 4/1995 |
| JP | 2006001789 A | 1/2006 |
| WO | 8911516 A1 | 11/1989 |
| WO | 9402565 A1 | 2/1994 |
| WO | 9530818 A1 | 11/1995 |
| WO | 9640836 A1 | 12/1996 |
| WO | 9730142 A1 | 8/1997 |
| WO | 98/36151 | 8/1998 |
| WO | 9907816 A1 | 2/1999 |
| WO | 9955634 A1 | 11/1999 |
| WO | 01/23703 A1 | 4/2001 |
| WO | 03093641 A1 | 11/2003 |
| WO | 2004/076561 A1 | 9/2004 |
| WO | 2006012622 A2 | 2/2006 |
| WO | 2006/120151 A2 | 11/2006 |
| WO | 2007003885 A2 | 1/2007 |
| WO | 2007/118328 A1 | 10/2007 |
| WO | 2008081158 A2 | 7/2008 |
| WO | 2009060405 A1 | 5/2009 |
| WO | 2009138383 A1 | 11/2009 |
| WO | 2010/030275 A1 | 3/2010 |
| WO | 2012101594 A1 | 8/2012 |
| WO | 2012158645 A1 | 11/2012 |
| WO | 2013055843 A1 | 4/2013 |
| WO | 2013154435 A1 | 10/2013 |
| WO | 2014107391 A1 | 7/2014 |
| WO | 2014164381 A1 | 10/2014 |
| WO | 2014193507 A1 | 12/2014 |
| WO | 2015000077 A1 | 1/2015 |
| WO | 2015006101 A1 | 1/2015 |
| WO | 2015/038117 A1 | 3/2015 |
| WO | 2015041649 A1 | 3/2015 |
| WO | 2016/189062 A1 | 12/2016 |

OTHER PUBLICATIONS

Office Action dated Dec. 19, 2018 pertaining to U.S. Appl. No. 15/489,930, filed Apr. 18, 2017.
Notice of Allowance and Fee(s) Due dated Jan. 8, 2019 pertaining to U.S. Appl. No. 15/485,479, filed Apr. 12, 2017.
Office Action dated Jan. 17, 2019 pertaining to U.S. Appl. No. 15/485,724, filed Apr. 12, 2017.
Office Action pertaining to U.S. Appl. No. 16/002,672 dated Sep. 14, 2018.
Office Action pertaining to. U.S. Appl. No. 16/002,669 dated Sep. 21, 2018.
Final Rejection dated Oct. 9, 2018 pertaining to U.S. Appl. No. 15/496,794.
Sabicol TA Series Synthetic Alcohol Ethoxylates, SGS, 2013, pp. 1-3, retrieved Sep. 28, 2018 from http://www.latro.com.tr/upload/1499842623-t2.pdf (Year:2013).
Office Action dated Feb. 11, 2019 pertaining to U.S. Appl. No. 15/496,794, filed Apr. 25, 2017, 6 pgs.
Office Action dated Feb. 11, 2019 pertaining to U.S. Appl. No. 15/920,879, filed Mar. 14, 2018, 38 pgs.
Office Action dated Feb. 7, 2019 pertaining to U.S. Appl. No. 16/002,669, filed Jun. 7, 2018, 54 pgs.
Office Action dated Feb. 21, 2019 pertaining to U.S. Appl. No. 16/037,493, filed Jul. 17, 2018, 52 pgs.
Office Action dated Jan. 24, 2019 pertaining to U.S. Appl. No. 15/489,854, filed Apr. 18, 2017, 46 pgs.
Office Action dated Feb. 5, 2019 pertaining to U.S. Appl. No. 15/612,397, filed Jun. 2, 2017, 67 pgs.
International Search Report pertaining to International Application No. PCT/US2018/014986, filed Jan. 24, 2018, 3 pages.
Written Opinion pertaining to International Application No. PCT/US2018/014986, filed Jan. 24, 2018, 12 pages.
International Search Report and Written Opinion dated Apr. 3, 2018 for PCT/US2018/016182 Filed Jan. 31, 2018. pp. 1-13.
Office Action dated Apr. 4, 2019 pertaining to U.S. Appl. No. 15/586,543, filed May 4, 2017, 23 pgs.
Office Action dated Apr. 8, 2019 pertaining to U.S. Appl. No. 15/660,118, filed Jul. 26, 2017, 76 pgs.
Notice of Allowance and Fee(s) Due dated May 15, 2019 pertaining to U.S. Appl. No. 15/922,077, filed Mar. 15, 2018, 27 pgs.
International Search Report and Written Opinion dated May 25, 2018, pertaining to International Application No. PCT/US2018/016167, filed Jan. 31, 2018, 20 pages.
International Search Report and Written Opinion dated May 29, 2018 pertaining to International Application No. PCT/US2018/015207 filed Jan. 25, 2018, 15 pages.
Office Action pertaining to U.S. Appl. No. 15/489,927 dated Jul. 6, 2018.
International Search Report and Written Opinion dated Apr. 3, 2018, pertaining to International Application PCT/US2018/016447, filed Feb. 1, 2018, 14 pages.

(56) References Cited

OTHER PUBLICATIONS

International Search Report and Written Opinion dated Apr. 20, 2018, pertaining to International Application PCT/US2018/016365, filed Feb. 1, 2018, 16 pages.
International Search Report and Written Opinion dated Apr. 20, 2018, pertaining to International Application PCT/US2018/016414, filed Feb. 1, 2018, 14 pages.
International Search Report and Written Opinion dated Apr. 16, 2018, pertaining to International Application PCT/US2018/016415, filed Feb. 1, 2018, 13 pages.
Non-Final Office Action dated Apr. 30, 2018 pertaining to U.S. Appl. No. 15/586,543, filed May 4, 2017.
Non-Final Office Action dated May 1, 2018 pertaining to U.S. Appl. No. 15/496,794, filed Apr. 25, 2017.
Shell Chemicals, HLB numbers, solvent miscibility and emulsification characteristics of NEODOL ethoxylates, retrieved Apr. 26, 2018 from https://www.shel.com/business-customers/chemicals/our-products/higher-olefins-and-derivatives/heodol-alchols-and-ethoxylates/_jcr_contents/par/tabbedcontent/tab_1780231844/textimage.
Akkutlu et al., "Molecular Dynamics Simulation of Adsorpotion from Microemulsions and Surfactant Micellar Solutions at Solid-Liquid, Liquid-Liquid and Gas-Liquid Interfaces", Tech Connector World Innovation Conference & Expo, Jun. 15-18, 2014, Washington D.C.
Fraser, Greig, "Method for Determining the Bioconcentration Factor of Linear Alcohol Ethoxylates", SPE Offshore Europe Oil and Gas Conference and Exhibition, Aberdeen, GB, Sep. 8-11, 2009, Society of Petroleum Engineers.
Inoue et al., "Interactions Between Engine Oil Additive", J. Japan Petrol. Inst., 1981, 24 (2), 101-107.
Joshi et al., "Physiochemical Behaviour of Ternary System Based on Coconut Oil/C12/E8/n-pentanol/Water", J. Surface Sci. Technol., 2013, 29 (1-2), 1-13.
Lim, Jongchoo, "Solubilization of Mixture of Hydrocarbon Oils by C12e 8 Nonionic Surfactant Solution", Journal of the Korean Industrial and Engineering Chemistry, 2008, 19, 59-65.
Luan et al., "Foaming Property for Anionic-Nonionic Gemini Surfactant of Polyalkoxylated Ether Sulfonate", Oilfield Chemistry, Tsinghua Tongfang Knowledge Network Technology Co., Ltd., 2006.
Min et al., "Research on Coking Dust Wettability of Strong Cohesiveness and Easy Mudding", Safety in Coal Mines, Tsinghua Tongfang Knowledge Network Technology Co., Ltd., 2006.
Mitchell et al., "Measurement of HTHP Fluid-Loss Equipment and Test Fluids with Thermocouples", American Association of Drilling Engineers, AADE Drilling Fluids Conference, Houston TX, Apr. 6-7, 2004.
Nelson, Erik B., "Well Cementing Fundamentals", Oilfield Review, Summer 2012, vol. 24, No. 2, 59-60, Schlumberger.
Paswan et al., "Development of Jatropha oil-in-water emulsion drilling mud system", Journal of Petroleum Science and Engineering, 2016, vol. 144, p. 10-18.
Sun et al., "Synthesis and Salt Tolerance Determination of Aliphatic Alcohol Polyoxyethylene Ethers Sulfonate Series", Journal of Chemical Industry & Engineering, Tsinghua Tongfang Knowledge Network Technology Co., Ltd., 2006.
Non-Final Office Action dated May 4, 2018 pertaining to U.S. Appl. No. 15/628,892, filed Jun. 21, 2017.
International Search Report and Written Opinion dated May 8, 2018 pertaining to International Application No. PCT/US2018/015631.
International Search Report and Written Opinion dated May 14, 2018 pertaining to International Application No. PCT/US2018/015640 filed Jan. 29, 2018, 16 pages.
International Search Report and Written Opinion dated May 9, 2018 pertaining to International Application No. PCT/US2018/015638 filed Jan. 29, 2018, 15 pages.
Non-Final Office Action dated May 25, 2018 pertaining to U.S. Appl. No. 15/485,724, 6 pages.
U.S. Office Action dated Apr. 11, 2019 pertaining to U.S. Appl. No. 15/628,892, filed Jun. 21, 2017, 34 pgs.
U.S. Notice of Allowance dated Apr. 24, 2019 pertaining to U.S. Appl. No. 15/485,724, filed Apr. 12, 2017, 23 pgs.
U.S. Notice of Allowance dated Apr. 26, 2019 pertaining to U.S. Appl. No. 15/489,930, filed Apr. 18, 2017, 14 pgs.
International Search Report pertaining to International Application No. PCT/US2018/015191, filed Jan. 25, 2018, 3 pages.
Written Opinion pertaining to International Application No. PCT/US2018/015191, filed Jan. 25, 2018, 8 pages.
International Search Report and Written Opinion dated Mar. 16, 2018 pertaining to International Application No. PCT/US2018/015140.
Non-Final Office Action dated Jan. 16, 2018 pertaining to U.S. Appl. No. 15/485,479, filed Apr. 12, 2017.
Office Action dated Feb. 27, 2019 pertaining to U.S. Appl. No. 15/922,077, filed Mar. 15, 2018, 69 pgs.
Notice of Allowance and Fee(s) Due dated Feb. 21, 2019 pertaining to U.S. Appl. No. 15/489,927, filed Apr. 18, 2017, 27 pgs.
Office Action dated Mar. 13, 2019 pertaining to U.S. Appl. No. 15/922,065, filed Mar. 15, 2018, 77 pgs.
Office Action dated Mar. 27, 2019 pertaining to U.S. Appl. No. 15/581,136, filed Apr. 28, 2017, 20 pgs.
Office Action dated Jun. 10, 2019 pertaining to U.S. Appl. No. 15/920,879, filed Mar. 14, 2018, 29 pgs.
Office Action dated Jun. 12, 2019 pertaining to U.S. Appl. No. 16/002,669, filed Jun. 7, 2018, 33 pgs
Office Action dated Jun. 14, 2019 pertaining to U.S. Appl. No. 15/489,854, filed Apr. 18, 2017, 20 pgs.
Office Action dated Jun. 24, 2019 pertaining to U.S. Appl. No. 16/037,493, filed Jul. 17, 2018, 31 pgs.
International Preliminary Report on Patentability for Application No. PCT/US2018/016415 dated Aug. 15, 2019.
Examination Report for Application No. GC2018-34707 dated Jul. 21, 2019.
Examination Report for Application No. GC2018-34710 dated Jul. 22, 2019.
Examination Report for Application No. GC2018-34701 dated Jul. 29, 2019.
Examination Report for Application No. 3,052,276 dated Sep. 5, 2019.
Examination Report for Application No. GC2018-34699 dated Aug. 21, 2019.
Examination Report for Application No. GC2018-34711 dated Jul. 28, 2019.
Examination Report for Application No. GC2018-34700 dated Aug. 21, 2019.
U.S. Office Action dated Jul. 3, 2019 pertaining to U.S. Appl. No. 15/496,794, filed Apr. 25, 2017, 52 pgs.
U.S. Office Action dated Jul. 2, 2019 pertaining to U.S. Appl. No. 16/039,525, filed Jul. 19, 2018, 75 pgs.
"Tridecyl Alcohol Ethoxylate," 2016, retrieved Jun. 28, 2019 from http://webcache.goggleusercontent.com/search?q=cache:OiTX51z527kJ:https://emochemicals.com/Ethoxylates/Ethoxylates/TRIDECYL-ALCOHOL-ETHOXYLATE&hl=en&gl=us&strip=1&vwsrc=0 (Year: 2016).
Notice of Allowance and Fee(s) Due dated Jul. 22, 2019 pertaining to U.S. Appl. No. 15/922,065, filed Mar. 15, 2018, 27 pgs.
Notice of Allowance and Fee(s) Due dated Jul. 31, 2019 pertaining to U.S. Appl. No. 15/628,892, filed Jun. 21, 2017, 19 pgs.
Office Action dated Aug. 12, 2019 pertaining to U.S. Appl. No. 15/612,397, filed Jun. 2, 2017, 45 pgs.
Final Rejection dated Aug. 5, 2019 pertaining to U.S. Appl. No. 15/586,543, filed May 4, 2017, 38 pgs.
Office Action dated Jul. 30, 2019 pertaining to U.S. Appl. No. 15/581,136, filed Apr. 28, 2017, 29 pgs.
Notice of Allowance and Fee(s) Due dated Aug. 21, 2019 pertaining to U.S. Appl. No. 15/920,879, filed Mar. 14, 2018, 13 pgs.
Notice of Allowance and Fee(s) Due dated Aug. 28, 2019 pertaining to U.S. Appl. No. 16/451,167, filed Jun. 25, 2019, 43 pgs.
Notice of Allowance and Fee(s) Due dated Oct. 11, 2019 pertaining to U.S. Appl. No. 16/037,493, filed Jul. 17, 2018, 17 pgs.

(56) References Cited

OTHER PUBLICATIONS

Notice of Allowance and Fee(s) Due dated Oct. 2, 2019 pertaining to U.S. Appl. No. 15/489,854, filed Apr. 18, 2017, 13 pgs.
Office Action dated Oct. 22, 2019 pertaining to U.S. Appl. No. 16/039,525, filed Jul. 19, 2018, 32 pgs.
Office Action dated Oct. 24, 2019 pertaining to U.S. Appl. No. 16/202,600, filed Nov. 28, 2018, 84 pgs.
Office Action dated Oct. 23, 2019 pertaining to U.S. Appl. No. 15/660,118, filed Jul. 26, 2017, 45 pgs.

* cited by examiner

SPACER FLUID COMPOSITIONS THAT INCLUDE SURFACTANTS

CROSS REFERENCES TO RELATED APPLICATIONS

This application claims priority to U.S. Provisional Patent Application Ser. No. 62/454,189 filed Feb. 3, 2017, and to U.S. Provisional Patent Application Ser. No. 62/454,192 filed Feb. 3, 2017, both of which are incorporated by reference herein in their entirety.

BACKGROUND

Technical Field

Embodiments of the present disclosure generally relate to natural resource well drilling and, more specifically, to spacer fluids utilized in well drilling processes.

Technical Background

There is a continual need for the discovery and extraction of subterranean fuel sources, such as oil or natural gas. Extracting subterranean fuel sources may require drilling a hole from the surface to the subterranean geological formation housing the fuel. Specialized drilling techniques and materials are utilized to form the borehole and extract the fuels. One such specialized material utilized in drilling operations is spacer fluid, which is positioned between drilling fluid and cement slurries during cementing processes in well bores.

Index of Abbreviated Terms

In the present disclosure, the following terms or units of measurement have been abbreviated, where:
°F.=degrees Fahrenheit
cP=centipose;
HLB=hydrophilic-lipophilic balance;
lb/100 ft$^2$=pounds per 100 square feet;
M=the molecular mass of the entire molecule in the Griffin Method calculation;
$M_h$=molecular mass of the hydrophilic portion of the molecule Griffin Method calculation;
min=minutes;
OBM=oil-based mud;
ppcf=pounds per cubic foot;
PV=plastic viscosity;
RPM=rotations per minute;
SOMB=synthetic oil-based mud;
wt. %=weight percent; and
YP=yield point.

SUMMARY

Well bores are commonly cemented, where the annulus between the tubular and the well bore wall is filled with cement. Prior to cementing, the well bore may be filled with an oil-based drilling fluid, sometimes referred to as drilling mud. To remove the drilling fluid, it may be displaced by the cement slurry, which enters the annulus, and is cured to cement. A spacer fluid may be utilized to separate the drilling fluid from the cement slurry, as the drilling fluid may be oil-based and the cement slurry may be water-based, such that their interaction would be detrimental to the cement slurry.

When cement slurries are water-based, and they may form stronger bonds with water-wettable surfaces. Therefore, well bore sections drilled with non-aqueous drilling fluid (resulting in oil-wet surfaces) may exhibit poor cement bonding if this issue is not addressed. Poor cement bonding may lead to poor isolation and consequently to a buildup of unwanted casing-casing or tubing-casing annular pressure.

Accordingly, there is a need for spacer fluids which provide enhanced wettability for cement slurries on surfaces which were previously contacted by non-aqueous (for example, oil-based) fluids, such as some drilling fluids. More specifically, the use of surfactant in the spacer fluid formulation may aid in avoiding the cement bonding issues due to the altered wettability of surfaces due to oil-based drilling fluids.

The presently disclosed spacer fluids typically include at least a base fluid, a weighting agent, a viscosifier, and a surfactant. In some embodiments, one role of the surfactant in the presently disclosed spacer fluid formulation is to improve mud removal and ensure the encountered surfaces are left water wet. The presently disclosed embodiments may provide spacer fluids that may improve water wettability by the inclusion of an ethoxylated alcohol surfactant having specific structures and properties. In one embodiment, the spacer fluid may include an ethoxylated alcohol having the formula R—(OCH$_2$CH$_2$)$_x$—OH, where R may be a branched or unbranched hydrocarbyl group having at least 9 carbon atoms, and x may be at least 5. For example, according to one embodiment, the spacer fluid includes the surfactant R—(OC$_2$H$_4$)$_8$—OH, where R is an iso-tridecyl group.

Without being bound by theory, it is believed that surfactant compositions having a particular range of hydrophilic-lipophilic balance (HLB) may impart superior performance to spacer fluids for qualities such as mud removal and enhanced water wettability. For example, surfactants having an HLB of from 12 to 13.5, such as 12.75, may impart these improved properties on the spacer fluid. HLB is affected by the size of a hydrocarbyl group in the "tail" or the amount of ethoxylation in the "head" of the surfactant. Therefore, the hydrocarbyl group and ethoxylation effect the HLB of the surfactant, and so choosing particular ethoxylation levels and size of hydrocarbyl groups can impart desirable properties such as increased water wettability on the spacer fluid.

In one embodiment, a spacer fluid may comprise a base fluid and a surfactant package. The surfactant package may comprise one or more surfactants, where the surfactant package comprises a first surfactant having the chemical structure R—(OC$_2$H$_4$)$_x$—OH. R may be a hydrocarbyl group having from 9 to 20 carbon atom, and x may be an integer from 5 and 15. The first surfactant may have a hydrophilic-lipophilic balance (HLB) of from 12 to 13.5.

In another embodiment, a spacer fluid may comprise a base fluid and a surfactant package. The surfactant package may comprise one or more surfactants, where the surfactant package comprises a first surfactant having the chemical structure:

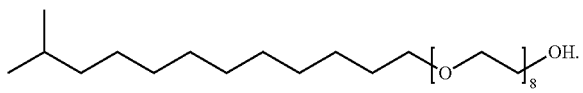

In yet another embodiment, a well bore may be cemented by a method comprising displacing at least a portion of a drilling fluid positioned in the well bore with a spacer fluid, displacing the spacer fluid with a cement slurry, and forming cement from the cement slurry. The spacer fluid may comprise any of the spacer fluids described in the present disclosure. In additional embodiments, the spacer fluid may be pumped into a first conduit defined by an interior wall of a tubular in the well bore, and the cement slurry may be pumped into the first conduit. At least a portion of the drilling fluid may exit the well bore through a second conduit defined by an exterior wall of the tubular and a wall of the well bore. The cement may be formed in the second conduit.

Additional features and advantages of the described embodiments will be set forth in the detailed description which follows, and in part will be readily apparent to those skilled in the art from that description or recognized by practicing the described embodiments, including the detailed description which follows as well as the claims.

DETAILED DESCRIPTION

Embodiments of the present disclosure are directed to spacer fluids and methods of making and using spacer fluid that have, among other attributes, improved water wettability of surfaces contacted by an oil-based fluid, such as an oil-based drilling fluid. As used throughout the disclosure, "spacer fluid" refers to a fluid utilized to space any two other materials utilized in well production. For example, a spacer fluid may be utilized to separate a cement slurry from a drilling fluid. In some embodiments, the spacer fluid of the present disclosure may contain a surfactant, such as an ethoxylated fatty acid. According to one or more embodiments, the spacer fluid includes a surfactant that is an ethoxylated alcohol compound having the chemical formula $R—(OCH_2CH_2)_x—OH$, where R is a saturated or unsaturated, linear or branched hydrocarbyl group having from 12 to 14 carbon atoms, and x is equal to the number of ethoxy moieties present in the compound. According to one or more embodiments, the surfactant may have a hydrophilic-lipophilic balance (HLB) of from 12 to 13.5, such as approximately 12.75. For example, according to one embodiment, the spacer fluid includes the surfactant $R—(OC_2H_4)_8—OH$, where R is an iso-tridecyl group.

A well bore is a hole that extends from the surface to a location below the surface. The well bore can permit access as a pathway between the surface and a hydrocarbon-bearing formation. The well bore, defined and bound along its operative length by a well bore wall, extends from a proximate end at the surface, through the subsurface, and into the hydrocarbon-bearing formation, where it terminates at a distal well bore face. The well bore forms a pathway capable of permitting both fluid and apparatus to traverse between the surface and the hydrocarbon-bearing formation.

Besides defining the void volume of the well bore, the well bore wall also acts as the interface through which fluid can transition between the interior of the well bore and the formations through which the well bore traverses. The well bore wall can be unlined (that is, bare rock or formation) to permit such interaction with the formation or lined (that is, with casing, tubing, production liner or cement) so as to not permit such interactions.

The well bore usually contains at least a portion of at least one fluid conduit that links the interior of the well bore to the surface. Examples of such fluid conduits include casing, liners, pipes, tubes, coiled tubing and mechanical structures with interior voids. A fluid conduit connected to the surface is capable of permitting regulated fluid flow and access between equipment on the surface and the interior of the well bore. Example equipment connected at the surface to the fluid conduit includes pipelines, tanks, pumps, compressors and flares. The fluid conduit is sometimes large enough to permit introduction and removal of mechanical devices, including tools, drill strings, sensors and instruments, into and out of the interior of the well bore.

The fluid conduit made from a tubular usually has at least two openings (typically on opposing ends) with an enclosing surface having an interior and exterior surface. The interior surface acts to define the bounds of the fluid conduit. Examples of tubulars and portions of tubulars used in the well bore as fluid conduits or for making or extending fluid conduits include casing, production liners, coiled tubing, pipe segments and pipe strings. An assembly of several smaller tubulars connected to one another, such as joined pipe segments or casing, can form a tubular that acts as a fluid conduit.

When positioning a tubular or a portion of tubular in the well bore, the volume between the exterior surfaces of the fluid conduit or tubular portion and the well bore wall of the well bore forms and defines a well bore annulus. The well bore annulus has a volume in between the external surface of the tubular or fluid conduit and the well bore wall.

The well bore contains well bore fluid from the first moment of formation until completion and production. The well bore fluid serves several purposes, including well control (hydraulic pressure against the fluids in the hydrocarbon-bearing formation), well bore wall integrity (hydraulic pressure on the well bore wall; provides loss control additives) and lubricity (operating machinery). Well bore fluid is in fluid contact with all portions of and everything in the well bore not fluidly isolated, including the tubular internal fluid conduit, the well bore annulus and the well bore wall. Other fluid conduits coupled to the well bore often contain at least some well bore fluid.

While drilling, drilling fluid ("mud") fills the interior of the well bore as the well bore fluid. Some muds are petroleum-based materials and some are water-based materials. Petroleum-based materials comprise at least 90 weight percent of an oil-based mud (OBM). Examples of suitable base petroleum materials include crude oils, distilled fractions of crude oil, including diesel oil, kerosene and mineral oil, and heavy petroleum refinery liquid residues. A minor part of the OBM is typically water or an aqueous solution that resides internally in the continuous petroleum phase. Other OBM components can include emulsifiers, wetting agents and other additives that give desirable physical properties.

Oil-based muds also include synthetic oil-based muds (SOBMs). Synthetic oil-based muds are crude oil derivatives that have been chemically treated, altered or and refined to enhance certain chemical or physical properties. In comparison to a crude temperature fraction of a partially-refined crude oil, which may contain several classes (for example, alkane, aromatic, sulfur-bearing, nitrogen-bearing) of thousands of individual compounds, a SOBM can comprise, one class with only tens of individual compounds (for example, esters compounds in a $C_{8-14}$ range). Examples of materials used as base fluids for SOBMs include linear alpha olefins, isomerized olefins, poly alpha olefins, linear alkyl benzenes and vegetable and hydrocarbon-derived ester compounds. SOBMs are monolithic systems that behave in a manner as if they were an oil-based mud but provide a more narrow and predictable range of chemical and physical behaviors.

While performing drilling operations, well bore fluid circulates between the surface and the well bore interior through fluid conduits. Well bore fluid also circulates around the interior of the well bore. The introduction of drilling fluid into the well bore through a first fluid conduit at pressure induces the motivation for the fluid flow in the well bore fluid. Displacing well bore fluid through a second fluid conduit connected to the surface causes well bore fluid circulation from the first fluid conduit to the second fluid conduit in the interior of the well bore. The expected amount of well bore fluid displaced and returned to the surface through the second fluid conduit is equivalent to the amount introduced into the well bore through the first fluid conduit. Parts of the well bore that are fluidly isolated do not support circulation.

Drilling muds that are not water based tend to dehydrate and lose additives during drilling operations. Dehydrated and additive-poor residues can collect in lower-flow velocity parts as solids, gels and highly viscous fluids. "Filter cake" is a layer of deposited solids and gelled drilling fluid that adheres to the interior surfaces of the well bore, including the well bore wall and the exterior of the fluid conduit.

Cementing is one of the most important operations in both drilling and completion of the well bore. Primary cementing occurs at least once to secure a portion of the fluid conduit between the well bore interior and the surface to the well bore wall of the well bore.

A variety of water-based cements slurries are available for primary cementing operations. Primary cements typically contain calcium, aluminum, silicon, oxygen, iron and sulfur compounds that react, set and harden upon the addition of water. The water used with the cement slurry can be fresh water or salt water and depend on the formation of the cement slurry and its tolerance to salts and free ions. Suitable water-based cements include Portland cements, pozzolana cements, gypsum cements, high alumina content cements, slag cements, silica cements, high alkalinity cements, latex and resin-based cements.

Primary cementing forms a protective solid sheath around the exterior surface of the introduced fluid conduit by positioning cement slurry in the well bore annulus. Upon positioning the fluid conduit in a desirable location in the well bore, introducing cement slurry into the well bore fills at least a portion if not all of the well bore annulus. When the cement slurry cures, the cement physically and chemically bonds with both the exterior surface of the fluid conduit and the well bore wall, coupling the two. In addition, the solid cement provides a physical barrier that prohibits gases and liquids from migrating from one side of the solid cement to the other via the well bore annulus. This fluid isolation does not permit fluid migration uphole of the solid cement through the well bore annulus.

Displacing well bore fluid for primary cementing operations is similar to establishing circulation in the well bore fluid with a drilling mud. An amount of cement slurry introduced into the well bore through a first fluid conduit induces fluid flow in the well bore and displaces an equivalent amount of well bore fluid to the surface through a second fluid conduit. In such an instance, the well bore fluid includes a portion of the well bore fluid previously contained in the well bore before cement introduction as well as the amount of the introduced cement slurry.

Cementing in the presence of filter cake can cause a cementing job to fail. The adhesion of filter cake and gelled fluid to the well bore wall or the tubular exterior is weak compared to the bond that cement can make. Cementing on top of filter cake strips the cake off the walls and exterior surfaces due to the weight of the cement upon curing. This lack of direct adhesion creates fluid gaps in and permits circulation through the well bore annulus.

Direct contact between the water-based cement slurry and the oil-based drilling mud can result in detrimental fluid interactions that can jeopardize not only cementing operations but also the integrity of the well bore. The intermingling of incompatible fluids can create emulsions (both water-in-oil and oil-in-water emulsions) between the fluids. The emulsions, which resist fluid movement upon the application of force, raises the viscosity profile of the well bore fluid. Increasing pumping head pressure to maintain a constant fluid circulation rate in the well bore can result in damaging the formation downhole as well bore fluid pressure exceeds the fracture gradient of the formation.

Besides detrimentally affecting the viscosity profile, when solids and water from the cement slurry transfer into the oil-based drilling mud during emulsification, the oil-based mud properties are detrimentally affected. Dilution, chemical interaction, breaking of a water-in-oil emulsion and flocculation of suspended additives out of the oil phase can also occur.

Cement slurry properties can also suffer from contamination by the OBM. Flocculation of weighting agents and macromolecules can cause the cement to have reduced compressive strength. The diffusion of ionic species from the OBM can cause premature setting of the cement slurry. The ramifications of early cement hardening include equipment damage, time delay, well bore damage and possible loss of the entire tubular string. Contamination of the cement slurry with bulk OBM results in higher slurry viscosity and higher fluid losses from the hardening slurry.

Without being bound by theory, it is believed that the spacer fluids presently disclosed may have a beneficial effect with respect to one or more of the problems with spacer cementing processes described. As previously described in the present description, the spacer fluid may comprise one or more of a base fluid, a surfactant package, a weighting agent, and a viscosifier. It should be understood that while embodiments of spacer fluids presently described include these components, other components may be included in a spacer fluid for various functional reasons, and it is contemplated that additional components may be included in the spacer fluids presently described. As used in this disclosure, a "surfactant package" refers to the group of one or more surfactant species which are included in the spacer fluid. For example, a surfactant package may include a single chemical species, or may alternatively include more than one chemical species. As should be appreciated, in the case of an ethoxylated alcohol, the degree of ethoxylation may vary from molecule to molecule by a standardized distribution, where some molecules include fewer than the desired number of ethoxy groups and some molecules include more than the desired number of ethoxy groups.

According to one or more embodiments, the surfactant may have the chemical structure of Chemical Formula 1:

$$R-(OC_2H_4)_x-OH \qquad \text{Chemical Formula 1}$$

in which R is a hydrocarbyl group having from 9 to 20 carbon atoms, and x is an integer from 5 to 15. As used in this disclosure, a "hydrocarbyl group" refers to a chemical group consisting of carbon and hydrogen. Typically, a hydrocarbyl group may be analogous to a hydrocarbon molecule with a single missing hydrogen (where the hydrocarbyl group is connected to another chemical group). An example spacer fluid composition incorporating the ethoxylated alcohol compound may include a base fluid, a weighting agent, a viscosifier, and a surfactant.

In one or more embodiments, the surfactant package may comprise an ethoxylated alcohol compound having the chemical formula $R-(OCH_2CH_2)_8-OH$, where R is a saturated or unsaturated, linear or branched hydrocarbyl group having from 12 to 14 carbon atoms.

As shown in Chemical Formula 1, x indicates the number of ethoxy groups included in the surfactant molecule. In some embodiments, x may be one of 1, 2, 3, 4, 5, 6, 7, 8, 9, 10, 11, 12, 13, 14, or 15. In some embodiments, x may be an integer from 5 to 10, from 5 to 9, from 7 to 10, or from 7 to 9. In some embodiments, x may be an integer greater than or equal to 5, such as an integer greater than or equal to 7, or greater than or equal to 8.

In Chemical Formula 1, R may be hydrocarbyl group, such as an alkyl (—$CH_3$), alkenyl (—CH=$CH_2$), alkynyl (—C≡CH), or cyclic hydrocarbyl group, such as a phenyl group. R may also contain saturated or unsaturated carbon atoms in a straight, branched, aliphatic or aromatic, both aliphatic and aromatic, or combinations of any of these configurations. In one or more embodiments, R may include from 5 to 20 carbons, such as from 5 to 18 carbons, from 5 to 16 carbons, from 5 to 14 carbons, from 5 to 12 carbons, from 5 to 10 carbons, from 5 to 8 carbons, from 5 to 6 carbons, or from 12 to 20 carbons, from 7 to 20 carbons, from 9 to 20 carbons, from 11 to 20 carbons, from 13 to 20 carbons, from 15 to 20 carbons, from 17 to 20 carbons, from 10 to 15 carbons, from 12 to 14 carbons, or 13 carbons. In some embodiments, R may be an alkyl or alkenyl group having from 10 to 15 carbon atoms. In some embodiments, R may be $C_{13}H_{27}$ (that is, a branched tridecyl group).

In some embodiments, the compound in the surfactant may be amphiphilic, meaning that it has a hydrophobic tail (that is, a non-polar R group) and a hydrophilic head (the polar ethoxy and alcohol groups) that may lower the surface tension between two liquids or between a liquid.

According to one embodiment, the R group may be an iso-tridecyl group (that is —$C_{13}H_{27}$), as depicted in Chemical Structure A. It should be understood that Chemical Structure A depicts an embodiment of the surfactant of Chemical Formula 1 where the R group is an iso-tridecyl group. According to another embodiment, Chemical Structure A may have 8 ethoxy groups (that is, x equals 8 in Chemical Structure A).

Chemical Structure A

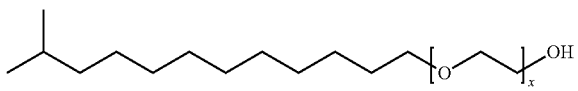

In some embodiments, the surfactant may be amphiphilic, and may have a hydrophilic-lipophilic balance (HLB) of from 11 to 13.5. As used in this disclosure, the HLB of the compound is the measure of the degree to which it is hydrophilic or lipophilic, which may be determined by the Griffin Method calculation, as shown in Equation 1:

$$HLB = 20 \times \frac{M_h}{M} \qquad \text{Equation 1}$$

in which $M_h$ is the molecular mass of the hydrophilic portion of the molecule and M is the molecular mass of the entire molecule. The resulting HLB value provides a result on a scale of from 0 to 20 in which a value of 0 indicates to a completely hydrophobic/lipophilic molecule and a value of 20 corresponds to a completely hydrophilic/lipophobic molecule. Generally, a molecule having an HLB of less than 10 is lipid-soluble (and thus water-insoluble) and a molecule having an HLB of greater than 10 is water-soluble (and thus lipid-insoluble).

In one or more embodiments, the ethoxylated alcohol compound may be a reaction product of a fatty alcohol ethoxylated with ethylene oxide. Generally, the molar ratio of the fatty alcohol to the ethylene oxide may be utilized to control the level of ethoxylation. In one or more embodiments, the surfactant consists essentially of the reaction product of the fatty alcohol ethoxylated with ethylene oxide at a 8:1 molar ratio of the fatty alcohol to the ethylene oxide.

In one or more embodiments, the ethoxylated alcohol compound may be made by reacting the fatty alcohol with ethylene oxide at a x:1 molar ratio of the fatty alcohol to the ethylene oxide, as shown in Chemical Formula 2. Ethylene oxide is a cyclic ether having the chemical formula $C_2H_4O$ and may be produced through oxidation of ethylene in the presence of a silver catalyst. The ethoxylation reaction may be conducted at an elevated temperature and in the presence of an anionic catalyst, such as potassium hydroxide (KOH) for example. The ethoxylation reaction proceeds according to the following Chemical Formula 2.

Chemical Formula 2

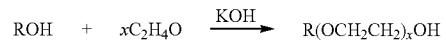

In Chemical Formula 2, R is the hydrocarbon portion of the fatty alcohol previously described in this disclosure. As shown in Chemical Formula 2, the reaction product may have the general chemical formula R—$(OCH_2CH_2)_x$—OH, where R is a saturated or unsaturated, linear or branched hydrocarbyl group having from 5 to 20 carbon atoms.

According to some embodiments, the fatty alcohols used as the reactant to make the ethoxylated alcohol compound include alcohols having formula R—OH, in which R is a saturated or unsaturated, linear, or branched hydrocarbyl group. In one or more embodiments, R may be a saturated linear hydrocarbyl group. Alternatively, the fatty alcohol may include R that is a branched hydrocarbyl group. The fatty alcohol may be a naturally-occurring fatty alcohol, such as a fatty alcohol obtained from natural sources such as animal fats or vegetable oils. The fatty alcohol may also be a hydrogenated naturally-occurring unsaturated fatty alcohol. Alternatively, the fatty alcohol may be a synthetic fatty alcohol prepared from a petroleum source or other source through one or more synthesis reactions. Non-limiting examples of fatty alcohols may include, but are not limited to capryl alcohol, perlargonic alcohol, decanol (decyl alcohol), undecanol, dodecanol (lauryl alcohol), tridecanol (tridecyl alcohol), myristyl alcohol (1-tetradecanol), pentadecanol (pentadecyl alcohol), cetyl alcohol, palmitoeyl alcohol (cis-9-hexadecenol), heptadecanol (heptadecyl alcohol), stearyl alcohol, nonadecyl alcohol, arachidyl alcohol, other naturally-occurring fatty alcohols, other synthetic fatty alcohols, or combinations of any of these fatty alcohols. In examples, the fatty alcohol may be produced through oligomerization of ethylene derived from a petroleum source, or in other examples, the fatty alcohol may be produced through hydroformylation of alkenes followed by hydrogenation of the hydroformylation reaction product. In one or more embodiments, the fatty alcohol may include a hydrocarbon chain (R) having 13 carbon atoms. Some example ethoxylated alcohol compounds may be made using a saturated linear fatty alcohol having a saturated linear hydrocarbyl group R with 13 carbon atoms.

As described previously, the spacer fluid may include a base fluid. The base fluid of the spacer fluid composition may be an aqueous based fluid, and can include deionized, tap, distilled or fresh waters; natural, brackish and saturated salt waters; natural, salt dome, hydrocarbon formation produced or synthetic brines; filtered or untreated seawaters; mineral waters; and other potable and non-potable waters containing one or more dissolved salts, minerals or organic materials. Fresh water may be utilized because of potential issues with introducing unnecessary amounts of ions, metals and minerals to cement slurry compositions that are more sensitive to such materials.

The spacer fluid composition may additionally include one or more viscosifiers. The viscosifier induces rheological properties (that is, thickening) in the spacer fluid composition that supports particle suspension and helps to prevent losses into the other fluids or the formation. The viscosifier can include biological polymers, clays, ethoxylated alcohols and polyether glycols. Biological polymers and their derivatives include polysaccharides, including xanthan gums, welan gums, guar gums, cellulose gums, corn, potato, wheat, maize, rice, cassava, and other food starches, succinoglycan, carrageenan, and scleroglucan and other intracellular, structural and extracellular polysaccharides. Biological polymers also include chemically modified derivatives such as carboxymethyl cellulose, polyanionic cellulose and hydroxyethyl cellulose (HEC) and forms of the polymers suspended in solvents. Clays and their derivatives include bentonite, sepiolite, attapulgite, and montmorillionite. Polyalklyene glycols include polyethylene glycols and polypropylene glycols, which are macromolecules with a series of internal ether linkages. Polyalklyene glycols are capable of dissolving in water and have a greater impact on viscosity with higher molecular weight. In one or more embodiments, the viscosifier may comprise TUNED SPACER E+, commercially available from The Halliburton Company, The viscosifier can also include a viscosity thinner. A viscosity thinner reduces flow resistance and gel development by reducing viscosity of the spacer fluid. Thinners can reduce the flow resistance and gel development of filter cake and disrupt gelled materials that the spacer fluid composition contacts in the well bore. Thinners comprising large molecular structures can also act as fluid loss additives. The functional groups of the viscosity thinners can act to emulsify oils and hydrocarbons present in the aqueous phase. Chemically modified viscosity thinners can attract solids and particles in the spacer fluid and disperse such particles, the dispersion of particles preventing any increase in viscosity of the spacer fluid due to aggregation. Ionic thinners can counter-act the effects of cement slurry intrusion into the aqueous spacer. Cement intrusion in the spacer fluid composition can result in greater saline concentration or higher pH, which in turn can cause the gel strength or the yield point value, or both, of the spacer fluid to rise. Low gel strength and yield point values may be good to maintain lower spacer fluid pumping pressure.

Polyphenoics, which include tannins, lignins, and humic acids, and chemically modified polyphenolics are useful viscosity thinners. Tannins and their chemically modified derivatives can either originate from plants or be synthetic. Examples of plant-originating tannins include tannins from pine, redwood, oak, and quebracho trees and bark; grapes and blueberries; and walnuts and chestnuts.

Chemically modified tannins include sulfomethylated and other sulfoalkylated tannins, causticized tannins, sulfated tannins, sodium-complexed tannin and sulfomethylated quebracho. Chemically modified lignins include sodium lignosulfonates, sugar-containing lignosulfonates, and de-sugared lignosulfonates. Humic acids, such as those extracted from decaying tree bark, are also useful rheology modifiers. Useful polyphenoics dissolve in the base aqueous fluid. In some instances, the chemically modified tannin pairs with similar ionic specie to assist in dissolving the tannin in the aqueous solution. For example, sulfomethylated tannins paired with ferrous sulfates are soluble in aqueous solutions.

The spacer fluid composition may also include one or more weighting agents. The weighting agent provides the spacer fluid with the proper density profile to separate the fluids from one another. The proper weighing of the spacer fluid composition relative to each fluid ensures that the spacer fluid composition does not "invert" with one of the other fluids present in the well bore. Weighting agents include sand, barite (barium sulfate), hematite, fly ash, silica sand, ilmenite, manganese oxide, manganese tetraoxide, zink oxide, zirconium oxide, iron oxide and fly ash. One desirable weighting agent for the spacer fluid composition may be barite. Embodiments of the spacer fluid composition include compositions not including calcium carbonate as the weighting agent.

The density profile of the spacer fluid composition relative to the other fluids may be such that the spacer fluid composition has a similar or greater density than the displaced fluid but has a lower density than the displacing fluid. In some instances, the displaced fluid is the oil-based mud and the displacing fluid is the water-based cement slurry. The higher density spacer fluid composition pushes gelled and solid remnants of the displaced fluid away from the well bore wall and fluid conduit exteriors.

The spacer fluid composition may have a density in the range of from 70 ppcf to 120 ppcf, such as from 80 ppcf to 90 ppcf. However, one of ordinary skill in the art should recognize that spacer fluids can have a density at any value within this range given the application circumstances and therefore understands that all values within the provided range are included.

The spacer fluid composition forms by combining one or more of the base fluid, the viscosifier, the weighting agent, the surfactant package. An example method of combining the spacer fluid components includes introducing into a vessel capable of retaining the spacer fluid composition a sufficient quantity of base aqueous fluid. Introducing each component into the base aqueous fluid separately and mixing the blend such that all the spacer fluid components are fully incorporated forms the spacer fluid composition. Blending means can include mixing using a low- or high-shear blender.

According to one or more embodiments, the various components of the spacer fluid may be present in the spacer fluid in amounts relative to the base fluid. In various embodiments, the weight ratio of base fluid to surfactant may be from 100:1 to 100:20, such as from 100:1 to 100:5, from 100:5 to 100:10, from 100:10 to 100:15, from 100:15 to 100:20, or from 100:7 to 100:10. In additional embodiments, the weight ratio of base fluid to a particular surfactant composition (such as any of those presently disclosed) may be from 100:1 to 100:20, such as from 100:1 to 100:5, from 100:5 to 100:10, from 100:10 to 100:15, from 100:15 to 100:20, from 100:1 to 100:10, from 100:1 to 100:5, or from 100:7 to 100:20. According to additional embodiments, the weight ratio of base fluid to viscosifier may be from 100:

0.05 to 100:7, such as from 100:0.05 to 100:2, from 100:2 to 100:4, from 100:4 to 100:7, from 100:0.05 to 100:0.1, or from 100:4 to 100:5. In additional embodiments, the weight ratio of base fluid to the weighting agent may be from 100:3 to 100:350, such as from 100:3 to 100:100, from 100:100 to 100:200, from 100:200 to 100:350, from 100:60 to 100:90, or from 100:100 to 100:150. While some example compositional ranges have been disclosed for the base fluid, the surfactant, the viscosifier, and the weighting agent, it should be appreciated that one of ordinary skill in the art would recognize the appropriate amount of various components for the spacer fluid composition presently described for one or more embodiments. Additionally, it should be understood that any compositional ranges supplied in this disclosure should be interpreted to mean that a combination of materials which fits into a particular class, such as a weighting agent, is in the composition range disclose, or that any single component of a particular class has the disclosed compositional range.

composed of seven moles of ethylene oxide condensate of synthetic branched iso decyl alcohol ($C_{10}H_{20}(OCH_2CH_2)_7OH$), the surfactant of Chemical Formula 1 where R is a branched iso decyl group and where x=7. Sample 4 utilized a nonionic surfactant composed of an adduct of naturally derived fatty alcohol C12-14 with nine moles of Ethylene Oxide (Natural Fatty Alcohol Ethoxylate), the surfactant of Chemical Formula 1 where x=9 and R is a naturally occurring hydrocarbyl group with 12-14 carbon atoms. Sample 5 utilized a nonionic surfactant composed of an adduct of naturally derived fatty alcohol C12-14 with one moles of Ethylene Oxide (Natural Fatty Alcohol Ethoxylate), the surfactant of Chemical Formula 1, where x=1 and R is a naturally occurring hydrocarbyl group with 12-14 carbon atoms. As shown in Table 1, Sample 6 did not include a surfactant package. All component amounts listed in Table 1 are in relative parts by weight.

TABLE 1

| Component (wt. %) | Sample 1 | Sample 2 | Sample 3 | Sample 4 | Sample 5 | Sample 6 |
|---|---|---|---|---|---|---|
| Water | 260.19 | 260.19 | 260.19 | 260.19 | 260.19 | 271.05 |
| Tuned Spacer E+ | 5.99 | 5.99 | 5.99 | 5.99 | 5.99 | 11 |
| D-Air-3000L | 0.39 | 0.39 | 0.39 | 0.39 | 0.39 | 1 |
| 7% KCl | 18.18 | 18.18 | 18.18 | 18.18 | 18.18 | 18.94 |
| Musol A | 15.1 | 15.1 | 15.1 | 15.1 | 15.1 | 15.1 |
| $BaSO_4$ | 172.08 | 172.08 | 172.08 | 172.08 | 172.08 | 170.17 |
| Surfactant | 15.33 | 15.33 | 15.33 | 15.33 | 15.33 | 0 |
| (type of surfactant) | (Commercially available LoSurf-259) | | | | | (no surfactant) |
| HLB | Not Available | 12.75 | 12.8 | 13.4 | 4.7 | — |

EXAMPLES

The following examples illustrate one or more additional features of the present disclosure described supra. It should be understood that these examples are not intended to limit the scope of the disclosure or the appended claims in any manner.

Example 1

Spacer fluids with different surfactants were analyzed for their relative invert emulsion mud removing efficiency, which will be defined subsequently in this disclosure. Specifically, example spacer fluids of the present disclosure, comparative example spacer fluid compositions, and example invert emulsion muds were synthsized. All spacer fluids were prepared using water, cement spacer (TUNED SPACER E+, a commercially available fluid from The Halliburton Company), defoaming agent (D-Air-3000L, commercially available from The Halliburton Company), 7 wt. % KCl based on weight of water, a solvent (MUSOL A, commercially available from The Halliburton Company), and barium sulfate ($BaSO_4$). Various example spacer fluids were prepared with varying surfactants, and a control example that did not include any surfactant was also prepared. Compositions of Samples 1-6 are shown in Table 1. Sample 1 utilized the commercially available surfactant package LoSurf-259, available from The Halliburton Company. Sample 2 utilized a surfactant composed of eight moles ethylene oxide condensate of synthetic branched iso tridecyl alcohol ($C_{13}H_{27}(OCH_2CH_2)_8OH$), the surfactant of Chemical Structure A (R is an iso-tridecyl group) and where x is equal to 8. Sample 3 utilized a nonionic surfactant The viscosities of Samples 1-6 were measured at shear rates of 3 RPM, 6 RPM, 100 RPM, 200 RPM, 300 RPM, and 600 RPM using a viscometer. A Fann Model 35 Viscometer was uilitized for testing, but it is believed that these tests can be conducted by any commercially available viscometer such as those manufactured by Fann or Chandler. These values were then used to calculate the plastic viscosity (PV) and yield point (YP) of each sample, where PV was equal to the 600 RPM reading less the 300 RPM reading, and the YP was equal to the 300 rpm reading less the PV. The rheology data of Samples 1-6 is provided in Table 2, along with the densities of those fluids. The rheology data of Samples 1-6 at the respective RPMs is provided in cP.

TABLE 2

| Property | Sample 1 | Sample 2 | Sample 3 | Sample 4 | Sample 5 | Sample 6 |
|---|---|---|---|---|---|---|
| 600 RPM | 46 | 27 | 29 | 29 | 32 | 71 |
| 300 RPM | 28 | 16 | 20 | 18 | 22 | 50 |
| 200 RPM | 20 | 12 | 14 | 14 | 15 | 41 |
| 100 RPM | 15 | 8 | 9 | 9 | 10 | 33 |
| 6 RPM | 8 | 3 | 3 | 3 | 4 | 24 |
| 3 RPM | 5 | 2 | 2 | 2 | 3 | 15 |
| PV (cP) | 18 | 11 | 9 | 11 | 10 | 21 |
| YP (lb/100 ft$^2$) | 10 | 5 | 11 | 7 | 12 | 29 |
| Density (ppcf) | 86.9 | 86.9 | 86.9 | 86.9 | 86.9 | 86.9 |

The drilling fluid utilized for conducting the invert emulsion mud removing efficiency is shown in Table 3. Additionally, the rheology and density of the example invert emulsion mud that was utilized in the testing is also provided in Table 4. The composition of this mud includes, among other components VG-69 (an organophilic clay viscosifier commercially available from Schlumberger Limited), Carbo-Trol-A9 (a filtration control agent commercially available from Eni S.p.A.), Carbo-Mul HT (a non-ionic emulsifier commercially available from Baker Hughes), and Carbo-TEC (a drilling mud commercially available from Baker Hughes).

TABLE 3

| Component | Wt. % of Total Mud Composition |
|---|---|
| diesel | 62.58 |
| Water | 18.80 |
| VG-69 | 1.33 |
| Carbo-Trol-A9 | 2.00 |
| Carbo-Mul HT | 0.66 |
| $CaCl_2$ | 3.99 |
| Carbo-TEC | 2.66 |
| $Ca(OH)_2$ | 1.33 |
| $CaCO_3$ (fine) | 3.32 |
| $CaCO_3$ (medium) | 3.32 |

TABLE 4

| RPM | Viscometer Reading (cP) |
|---|---|
| 600 | 32 |
| 300 | 20 |
| 200 | 14 |
| 100 | 10 |
| 6 | 5 |
| 3 | 3 |
| PV (cP) | 12 |
| YP (lb/100 ft$^2$) | 8 |

A grid test was performed in order to measure the mud displacement efficiency of each example and comparative example spacer fluid. In each grid test, the viscometer's rotor was fitted with a grid and immersed in the Invert Emulsion Mud of Table 3. Then, the mud-coated grid was rotated in a spacer fluid for set intervals of time to check for mud removal efficiency. The mud removal efficiency is the percentage of mud that is removed from the grid after a particular amount of time at a particular rotation speed, based on the mass of the grid when weighed. Specifically, the mud removal efficiency baseline was a grid samples which had been dipped into the mud for 10 minutes and the allowed to drip for 2 minutes. (time=0). Then the grid sample was placed in a viscometer cup preheated to 140° F. and immersed in the sample spacer fluid. The rotor was then rotated for 5 min at 100 RPM, then removed and allowed to drip for 2 min. After dripping, the grid was weighed (for time=5 min) and the weight of the material stuck to the grid was determined. This process was repeated for additional time intervals at 100 RPM rotation (for time=10 min, time=15 min, time=20 min, and time=30 min). Positive mud removal efficiencies indicated that net mud was removed. Some samples showed negative mud removal efficiencies, indicating that some components of the spacer fluid samples were sticking to the mud on the grid. Tables 5A and 5B shows mud removal efficiencies for Samples 1-6, as well as the measured weight of the rotor and grill (including the mud).

TABLE 5A

| | Sample 1 | | Sample 2 | | Sample 3 | |
|---|---|---|---|---|---|---|
| Time (min) | Weight (g) | Mud Removal % | Weight (g) | Mud Removal % | Weight (g) | Mud Removal % |
| Prior to mud loading on grid | 149.1 | N/A | 149.0 | N/A | 148.9 | N/A |
| 0 | 151.8 | 0.00% | 151.6 | 0.00% | 151.57 | 0.00% |
| 5 | 154.1 | −85.20% | 151.4 | 6.50% | 150.9 | 26.60% |
| 10 | 154.1 | −85.20% | 150.7 | 34.20% | 152.33 | −27.80% |
| 15 | 153.75 | −72.20% | 151.3 | 11.40% | 151.9 | −11.40% |
| 20 | 153.9 | −77.80% | 151.4 | 7.60% | 152.79 | −45.20% |
| 30 | 153.7 | −70.40% | 151.6 | 0.00% | 152.53 | −35.40% |

TABLE 5B

| | Sample 4 | | Sample 5 | | Sample 6 | |
|---|---|---|---|---|---|---|
| Time (min) | Weight (g) | Mud Removal % | Weight (g) | Mud Removal % | Weight (g) | Mud Removal % |
| Prior to mud loading on grid | 148.9 | N/A | 151.17 | N/A | 149.0 | N/A |
| 0 | 151.95 | 0.00% | 153.65 | 0.00% | 151.6 | 0.00% |
| 5 | 150.9 | 34.40% | 153.74 | −109.30% | 158.8 | −284.30% |
| 10 | 150.9 | 34.40% | 153.35 | −113.20% | 158.5 | −272.50% |
| 15 | 151.5 | 14.80% | 153.2 | −96.00% | 159.1 | −296.10% |
| 20 | 150.9 | 34.40% | 153.45 | −89.40% | 158.7 | −280.40% |
| 30 | 150.8 | 37.70% | 151.17 | −100.40% | 158.4 | −268.60% |

As shown in Table 5, the spacer fluids of Samples 2 and 4 (x equal to 8 or 9) performed better than the spacer fluids of Samples 1, 3, 5, and 6, which contained the commercially available surfactant, a surfactant with an ethoxylation of x=7, a surfactant with an ethoxylation of x=1, and no surfactant, respectively.

Example 2

The mud removal efficiency was measured for Samples 1, 2, and 4 in a manner similar to that of Example 1, but the experimentation was conducted with a mixture of water and the surfactants of Samples 1, 2 and 4 instead of the spacer fluid composition. The concentration of surfactant to water was 5.89:100 by weight. Pure water was also tested as a control. Table 6 shows the results of the mud removal efficiency of the aqueous solutions of the surfactants.

TABLE 6

| Time (min) | Aqueous Solution of Surfactant of Sample 1 | | Aqueous Solution of Surfactant of Sample 2 | | Aqueous Solution of Surfactant of Sample 4 | | Water | |
|---|---|---|---|---|---|---|---|---|
| | Weight (g) | Mud Removal % | Weight (g) | Mud Removal % | Weight (g) | Mud Removal % | Weight (g) | Mud Removal % |
| Prior to mud loading on grid | 149.03 | N/A | 151.5 | N/A | 151.15 | N/A | 148.84 | N/A |
| 0 | 151.83 | 0.0% | 150.42 | 0.0% | 150.74 | 0.0% | 151.42 | 0.0% |
| 10 | 151.35 | 17.1% | 150.14 | 41.9% | 150.44 | 18.1% | 151.4 | 0.8% |
| 20 | 150.8 | 36.8% | 149.84 | 52.7% | 150.48 | 31.4% | 151.54 | −4.7% |
| 30 | 150.49 | 47.9% | 151.5 | 64.3% | 151.15 | 29.6% | 151.61 | −7.4% |

As is shown in Table 6, the surfactant of Sample 1 (ethoxylation x=8) outperformed the other samples tested (commercial surfactant and ethoxylation x=9).

Example 3

Concentrations of the surfactant of Sample 2 (ethoxylation x=8) was varied and tested to determine relative invert emulsion mud removing efficiencies. Samples 7-9 contained the same components of Sample 2, but were varied in the amount of surfactant and other components utilized. Table 6 shows the spacer fluid compositions of Samples 7-9. Table 7 shows the rheological and other properties of these samples.

TABLE 6

| Component | Sample 7 | Sample 8 | Sample 9 |
|---|---|---|---|
| Water | 254.39 | 250.23 | 247.73 |
| Tuned Spacer E+ | 11.00 | 11.00 | 11.00 |
| D-Air | 1.00 | 1.00 | 1.00 |
| 7% KCl | 17.78 | 17.49 | 17.31 |
| Musol A | 15.1 | 15.1 | 15.1 |
| Surfactant | 15.33 | 19.16 | 21.46 |
| BaSO$_4$ | 172.67 | 173.29 | 173.66 |

TABLE 7

| Property | Sample 7 | Sample 8 | Sample 9 |
|---|---|---|---|
| 600 RPM | 48 | 44 | 47 |
| 300 RPM | 31 | 29 | 29 |
| 200 RPM | 23 | 22 | 23 |
| 100 RPM | 16 | 16 | 17 |
| 6 RPM | 6 | 6 | 7 |
| 3 RPM | 4 | 4 | 5 |
| PV (cP) | 17 | 15 | 18 |
| YP (lb/100 ft$^2$) | 14 | 14 | 11 |
| Density (pcf) | 86.9 | 86.9 | 86.9 |

Sample 7-9 were then measured for invert emulsion mud removal efficiency with a grid test, as described in Example 1. The results of these mud removal efficiency tests are shown in Table 8. Additionally, it is noted that Samples 7-9 contained more viscosifier, Tuned Spacer E+, which results in a more challenging test and overall greater rheology readings than in Sample 2.

TABLE 8

| Time (min) | Sample 7 | | Sample 8 | | Sample 9 | |
|---|---|---|---|---|---|---|
| | Weight (g) | Mud Removal % | Weight (g) | Mud Removal % | Weight (g) | Mud Removal % |
| Prior to mud loading on grid | 149.1 | N/A | 151.5 | N/A | 151.7 | N/A |
| 0 | 151.8 | 0.0% | 151.52 | 0.0% | 151.71 | 0.0% |
| 5 | 154.1 | −85.2% | 150.77 | 28.3% | — | — |
| 10 | 154.1 | −85.2% | 151.36 | 6.0% | 151.82 | −3.8% |
| 15 | 153.75 | −72.2% | 151.7 | −6.8% | — | — |
| 20 | 154.1 | −85.2% | 151.74 | −8.3% | 154.8 | −108.0% |
| 30 | 153.75 | −72.2% | 152.1 | −21.9% | 155.37 | −128.0% |

The results shown in Table 8 show that spacer fluids with a surfactant concentration of 19.16 parts by weight per 250.23 parts by weigh of water (Sample 8) outperformed the other concentrations tested.

It should be understood that any two quantitative values assigned to a property may constitute a range of that property, and all combinations of ranges formed from all stated quantitative values of a given property are contemplated in this disclosure. It should be appreciated that compositional ranges of a chemical constituent in a composition or formulation should be appreciated as containing, in some embodiments, a mixture of isomers of that constituent. It should be appreciated that the examples supply compositional ranges for various compositions, and that the total amount of isomers of a particular chemical composition can constitute a range.

Having described the subject matter of the present disclosure in detail and by reference to specific embodiments, it is noted that the various details described in this disclosure should not be taken to imply that these details relate to elements that are essential components of the various embodiments described in this disclosure, even in cases where a particular element is illustrated in each of the drawings that accompany the present description. Rather, the appended claims should be taken as the sole representation of the breadth of the present disclosure and the corresponding scope of the various embodiments described in this disclosure. Further, it should be apparent to those skilled in the art that various modifications and variations can be made to the described embodiments without departing from the spirit and scope of the claimed subject matter. Thus it is intended that the specification cover the modifications and variations of the various described embodiments provided such modification and variations come within the scope of the appended claims and their equivalents.

As used in the Specification and appended Claims, the singular forms "a", "an", and "the" include plural references unless the context clearly indicates otherwise. The verb "comprises" and its conjugated forms should be interpreted as referring to elements, components or steps in a non-exclusive manner. The referenced elements, components or steps may be present, utilized or combined with other elements, components or steps not expressly referenced.

Where a range of values is provided in the Specification or in the appended Claims, it is understood that the interval encompasses each intervening value between the upper limit and the lower limit as well as the upper limit and the lower limit. The invention encompasses and bounds smaller ranges of the interval subject to any specific exclusion provided.

What is claimed is:

1. A spacer fluid comprising:
   a base fluid; and
   a surfactant package consisting essentially of one or more surfactants having the chemical structure R—(OC$_2$H$_4$)$_x$—OH, where:
   R is a hydrocarbyl group having from 9 to 20 carbon atom;
   x is an integer from 5 and 15; and
   the surfactant package is the group of one or more surfactant species which are included in the spacer fluid, where the one or more surfactants of the surfactant package have a HLB of from 12 to 13.5.

2. The spacer fluid of claim 1, where the one or more surfactants of the surfactant package have a HLB of from 12.5 to 13.

3. The spacer fluid of claim 1, where x is an integer from 5 to 10.

4. The spacer fluid of claim 1, where x is 8.

5. The spacer fluid of claim 1, where R is a hydrocarbyl group comprising from 10 to 15 carbon atoms.

6. The spacer fluid of claim 1, where R is a hydrocarbyl group comprising 13 carbon atoms.

7. The spacer fluid of claim 1, where R is a branched hydrocarbyl group.

8. The spacer fluid of claim 1, where R is an iso-tridecyl group.

9. The spacer fluid of claim 1, where the one or more surfactants of the surfactant package have the structure:

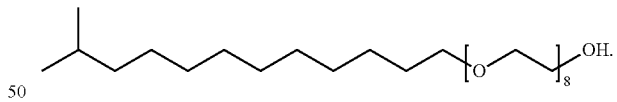

10. The spacer fluid of claim 1, where the base fluid comprises at least 90 wt. % water.

11. The spacer fluid of claim 1, further comprising a weighting agent.

12. The spacer fluid of claim 11, where the weight ratio of base fluid to weighting agent is from 100:3 to 100:350.

13. The spacer fluid of claim 1, further comprising a viscosifier.

14. The spacer fluid of claim 13, where the weight ratio of base fluid to the viscosifier is from 100:0.05 to 100:7.

15. The spacer fluid of claim 1, where the weight ratio of base fluid to the one or more surfactants is from 100:1 to 100:20.

16. The spacer fluid of claim 1, where the surfactant package consists of one or more surfactants having the chemical structure R—(OC$_2$H$_4$)$_x$—OH, where:

R is a hydrocarbyl group having from 9 to 20 carbon atom:

x is an integer from 5 and 15; and the one or more surfactants of the surfactant package have a HLB of from 12 to 13.5.

\* \* \* \* \*